US007301469B1

(12) United States Patent
Hoffman et al.

(10) Patent No.: US 7,301,469 B1
(45) Date of Patent: Nov. 27, 2007

(54) REMOTELY ACTIVATED TRAIL MARKER SYSTEM AND ITS METHOD OF USE

(76) Inventors: Robert A. Hoffman, 1133 New Holland Ave., Lancaster, PA (US) 17601; Leo J. Hoffman, Jr., 561 Snyder Hollow Rd., New Providence, PA (US) 17560

(*) Notice: Subject to any disclaimer, the term of this patent is extended or adjusted under 35 U.S.C. 154(b) by 118 days.

(21) Appl. No.: 11/073,176

(22) Filed: Mar. 7, 2005

(51) Int. Cl.

| | |
|---|---|
| ***F21V 33/00*** | (2006.01) |
| ***G08B 23/00*** | (2006.01) |
| ***G08B 5/36*** | (2006.01) |
| ***F21L 4/00*** | (2006.01) |
| ***H04M 1/22*** | (2006.01) |

(52) U.S. Cl. .............................. 340/815.54; 340/573.4; 362/191; 362/85

(58) Field of Classification Search .............................. 340/539.1–539.16, 815.53, 815.54, 815.78, 340/815.79, 815.8, 825.36, 7.5, 825.49, 825.71, 340/825.72, 693.5, 693.9; 116/1, 173, 202; 359/527; 343/720, 721
See application file for complete search history.

(56) References Cited

U.S. PATENT DOCUMENTS

| | | | | |
|---|---|---|---|---|
| 3,323,117 | A * | 5/1967 | Mason | 340/321 |
| 5,307,053 | A * | 4/1994 | Wills et al. | 340/573.1 |
| 6,175,308 | B1 * | 1/2001 | Tallman et al. | 340/539.11 |
| D445,710 | S | 7/2001 | Lewis | D10/109 |
| 6,299,379 | B1 * | 10/2001 | Lewis | 404/9 |
| 6,533,435 | B2 * | 3/2003 | Brown | 362/191 |
| 6,535,125 | B2 * | 3/2003 | Trivett | 340/539.13 |
| 7,080,577 | B2 * | 7/2006 | Latschbacher et al. | 81/23 |
| 2001/0044282 | A1 * | 11/2001 | Lanza | 455/92 |
| 2002/0152948 | A1 | 10/2002 | Percle | |
| 2006/0023455 | A1 * | 2/2006 | Hardin | 362/253 |

* cited by examiner

*Primary Examiner*—Benjamin C. Lee
*Assistant Examiner*—Jennifer Mehmood
(74) *Attorney, Agent, or Firm*—LaMorte & Associates

(57) ABSTRACT

A trail marking system having a plurality of trail markers, a remote control handset for selectively activating the trail markers, and a setting tool for setting and removing the trail markers. To use the trail marking system, a hunter attaches a trail marker into a tree using the setting tool. The trail markers contain externally perceivable indicators that can be selectively turned on an off. When the indicators in the trail markers are off, the trail markers are inconspicuous. However, when the indicators are activated, they are highly visible. The trail markers are selectively turned on an off using the remote control handset. As such, a hunter can selectively turn on and off the trail markers as he/she walks along the trail.

15 Claims, 6 Drawing Sheets

REMOTELY ACTIVATED TRAIL MARKER SYSTEM AND ITS METHOD OF USE

BACKGROUND OF THE INVENTION

1. Field of the Invention

In general, the present invention relates to trail markers that are used to mark a trail for a person walking in the woods or other undeveloped land.

2. Prior Art Description

Since well before the writing of "Hansel and Gretel" it has been a practice of people to mark their trail when entering an area of land of which they are unfamiliar. By marking one's trail, a person can easily retrace their steps and find their way back to where they began.

In modern times, there are portable global positioning systems and other electronic gadgets that can instantly inform a person of their exact location in the wild. However, in some circumstances, the traditional method of marking a trail is still the most effective method. One such circumstance is when a hunter positions a tree stand or some other hunting blind in the woods. Hunters often travel through woods and fields looking for areas that contain signs of game animals. If a promising site is found, many hunters erect tree stands or some other hunting blind in that location so that they can return to that site from time to time during the hunting season. If game animals do not approach the area of the blind or are observed in some other location, it is not unusual for a hunter to reposition a tree stand or blind on a day-to-day basis.

Tree stands and other hunting blinds are typically camouflaged or otherwise made to blend into the surrounding landscape. In this manner, the tree stand or blind is hard to see by game animals. However, after a hunter sets up a tree stand or blind in a selected location, it is often difficult for the hunter to quickly find that location again without searching the area and alerting game animals to the presence of the hunter. It is for this reason that hunters often mark the trail to the position of their tree stand or hunting blind as they walk away from that position. Often hunters mark their trails with natural objects, such as sticks and rocks. But such material is not always conveniently available. As such, many hunters bring with them trail marking objects that are specifically intended for use in marking the trail to and from a hunting position.

One of the most common trail marking devices is a thumbtack. Hunters mark their trails by periodically pushing a thumbtack into a tree along the path. However, thumbtacks are small and are hard to see. Hunters often travel to and from their hunting positions in the dark or in low light conditions. Finding a thumbtack on a tree is very difficult in bright sunlight. It is much more difficult in the dark. A hunter must therefore search for the presence of thumbtacks around trees on the trail. This searching often alerts game animals to the presence of the hunter.

In an attempt to make thumbtack trail marker more visible, prior art thumbtack markers have been made with light reflecting material. Such prior art trail marking devices are exemplified by U.S. Pat. No. 6,299,379 to Lewis, entitled Reflective Trail Markers, and U.S. Pat. No. D 445,710, to Lewis, entitled Reflective Trail Marker. Trail markers have also been made using reflective streamers. The streamers have much larger surface areas than do thumbtacks and are therefore much easier to see. Trail markers that use streamers are exemplified by U.S. Patent Application Publication No. 2002/0152948 to Percle, entitled Easily Carried Night And Day Trail Marker.

Although trail markers with reflective properties are easier to see, they do present a problem. Many people, other than a hunter, may travel through a track of land and see the trail markers. Children and adolescents have a tendency to take or move trail markers. Other hunters may follow the trail markers and use or steal the hunter's tree stand or blind. Additionally, other hunters, activists, local homeowners and the like may also remove the trail markers, not wanting hunters in the area.

A need therefore exists for a trail marking device that is highly visible to a hunter, even in low light conditions, yet is inconspicuous to all others except the hunter. This need is met by the present invention as described and claimed below.

SUMMARY OF THE INVENTION

The present invention is a trail marking system that is used to mark a trail through the woods or any other undeveloped track of land. The trail marking system includes a plurality of electronic trail marking indicators that can be selectively activated by a remote control signal. Each of the trail marking indicators has a housing for containing the various electronic components. Furthermore, each trail marking indicator has a spike extending from it that enables the trail marking indicator to selectively engage a tree or the ground.

Within each trail marking indicator is a light source and/or a noise generator. Each trail marking indicator also includes a signal detector that can detect a remote activation signal. The trail marking indicator becomes activated when the signal detector detects said remote activation signal. In this manner, a person can mark a trail with the trail marking indicators and activate those trail marking indicators by remote control only when needed. In this manner, the trail marking indicators will only mark a trail for a person with the proper remote control signal transmitter. The trail marking indicators remain inconspicuous to all other.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention trail marking system can be used to mark many types of pathways, such as garden paths, nature trails and the like, the present invention is particularly well suited for marking a hunter's trail to a selected hunting site. Accordingly, the exemplary embodiment of the present invention is described in use by a hunter, in order to set forth the best mode contemplated for the invention. However, the exemplary use should not be considered a limitation on other applications of the invention.

Figure 1:
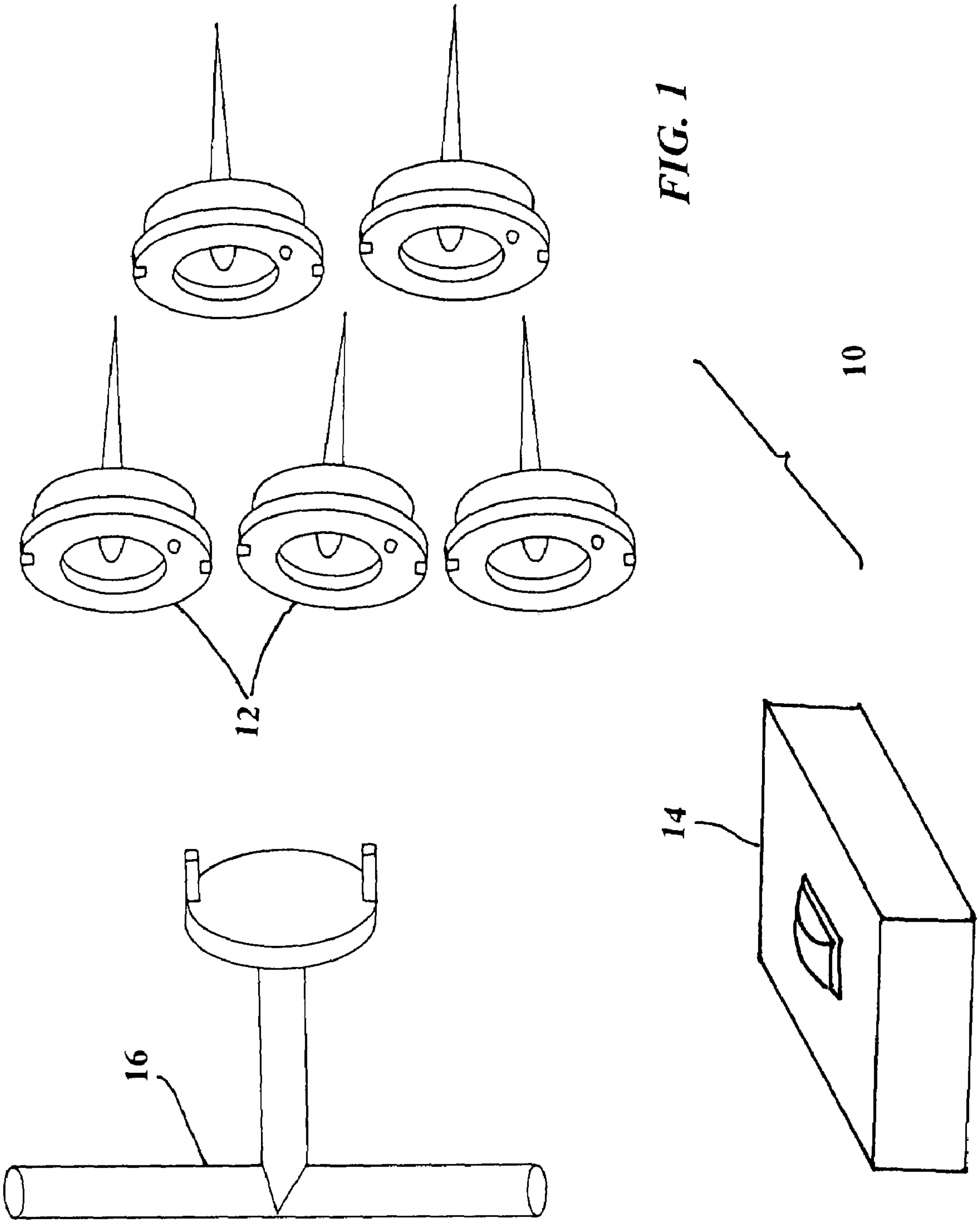
FIG. 1 is a perspective view of an exemplary embodiment of the present invention trail marking system, having trail markers, a remote control handset and a setting tool.

Referring to FIG. 1, there is shown a trail marking system 10 in accordance with the present invention. The trail marking system 10 is comprised of a plurality of trail markers 12, a remote control handset 14 for selectively activating the trail markers 12, and a setting tool 16 for setting and removing the trail markers 12.

To use the trail marking system 10, a hunter attaches a trail marker 12 into a tree, post or similar object using the setting tool 16. The trail markers 12 are set along a hunter's path so that the hunter can readily find that path at another time. The trail markers 12 contain lights that can be selectively turned on an off. When the lights in the trail markers 12 are off, the trail markers 12 are inconspicuous and hard to see. The trail markers 12 are purposely made small and dark so as to be inconspicuous when not illuminated. The exterior of the trail markers 12 may even be camouflaged so that even a person staring directly at a trail marker 12 may not identify it as a trail marker 12. However, when the trail markers 12 are illuminated, they are highly visible, both in low-light conditions and in broad daylight. Each trail marker 12 contains a high output light emitting diode that can emit a bright light in a variety of different colors.

The trail markers 12 are selectively turned on an off using the remote control handset 14. As such, a hunter can selectively turn on and off the trail markers 12 as he/she walks along the trail. Using the remote control handset 14, a hunter can stand at the beginning of the trail and press the remote control handset 14. The trail markers 12 within range of the remote control handset 14 will illuminate along the trail. The hunter progresses along the trail, periodically pressing the remote control handset 14, until the trail markers 12 guide the hunter to the desired hunting location. Accordingly, a hunter can easily see the trail markers 12, even in the dark, while people other than the hunter will not observe the trail markers 12 at all.

The trail markers 12 can be pressed into a tree by the hunter's fingers. However, the setting tool 16 is provided that selectively engages the trail markers 12. The setting tool 16 has an enlarged handle 17 that facilitates the pressing of a trail marker 12 into a tree and the pulling of that trail markers 12 from a tree.

Figure 2:
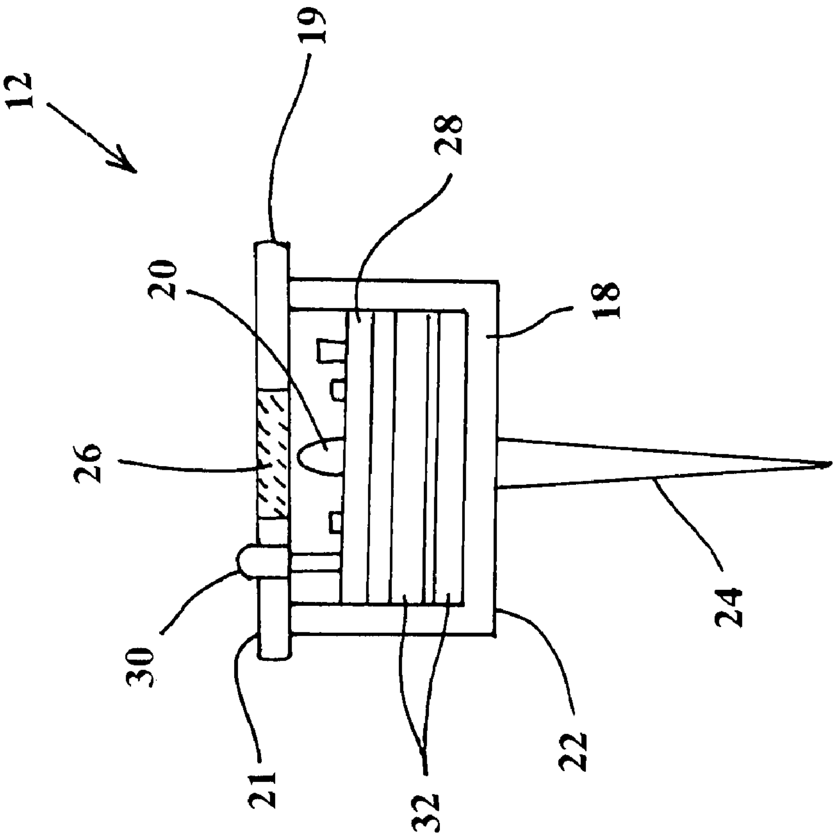
FIG. 2 is a cross sectional view of an exemplary embodiment of a trail marker.

Referring to FIG. 2, it can be seen that each trail marker 12 has a housing 18. The shown housing 18 contains a keyed edge 19 that is selectively engaged by the setting tool 16 (FIG. 1). The exterior of the housing 18 preferably is dark in color or may have a camouflage pattern to match the bark of a tree or leaves. The housing 18 has a face surface 21 and a rear surface 22. A mechanical fastener 24, such as a spike or screw, extends from the rear surface 22 of the housing 18 and enables the housing 18 to be manually impaled into a tree, post or similar wooden surface.

The housing 18 is small so as to be inconspicuous. The housing 18 preferably has a volume of less than one cubic inch. Within this small space is contained all the electronic components needed to make the trail marker 12 work. The mechanical fastener 24 that extends from the housing 18 can be a screw. However, the mechanical fastener 24 is preferably a sharpened spike having a length of between ¼ of an inch and one inch.

A lens element 26 covers the face surface 21 of the housing 18. Under the lens element 26 is contained at least one light emitting diode (LED) 20. The LED 20 is oriented to shine light out through the lens element 26 and away from the face surface 21 of the housing 18. The lens element 26 disperses the light of the LED 20 so that the light from the LED 20 can be seen throughout a wide field of view.

The LED 20 is mounted to a small circuit board 28. An infrared sensor 30 is also contained on the small circuit board 28. The infrared sensor 30 detects if an infrared light within a specific frequency range is impinging upon the trail marker 20. If the infrared sensor 30 detects infrared light, the infrared sensor 30 activates the LED 20. Power for the circuit board 28 and LED 20 is provided by at least one disc battery 32 that is disposed within the housing 18 behind the circuit board 28.

Figure 3:
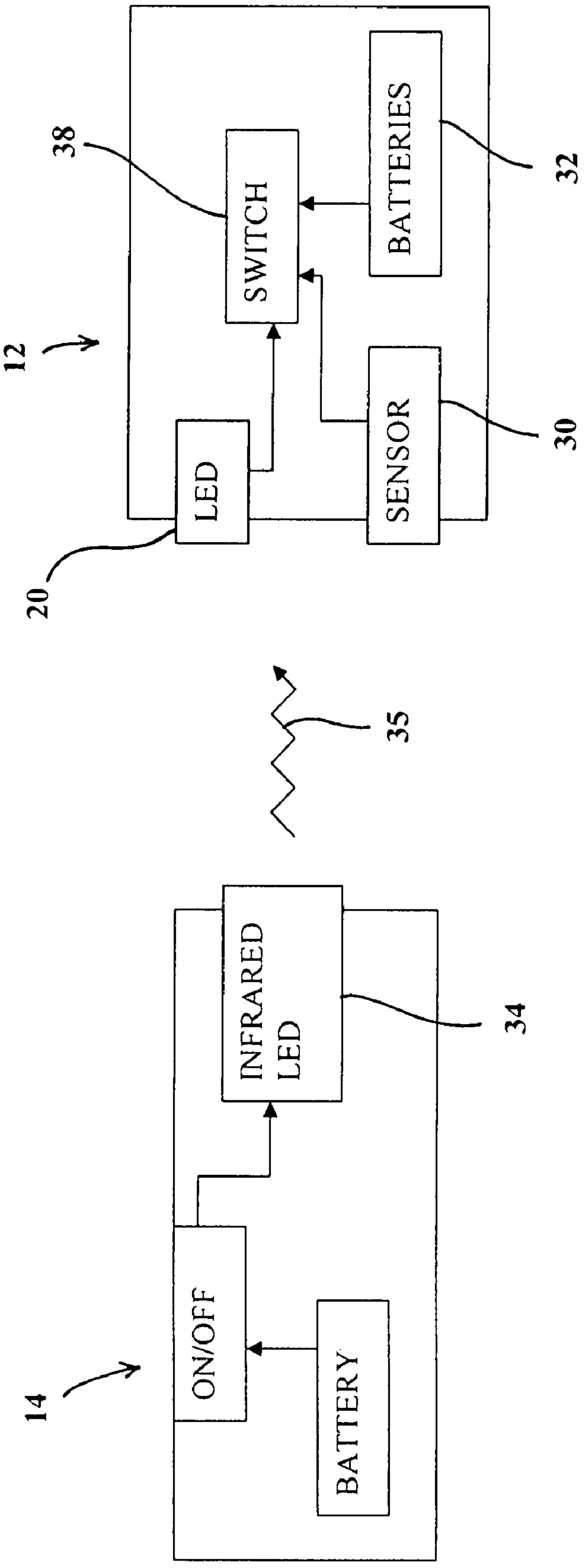
FIG. 3 is a schematic of an exemplary embodiment of a trail marker.

Referring to FIG. 3, it can be seen that the remote control handset 14 contains an infrared LED 34 that emits an infrared signal 35 when activated. The infrared signal 35 can be an encoded signal or may be a simple beam of light within a specific infrared frequency range. Within the trail marker 12, the infrared sensor 30 is connected to an electronic switch 38, such as a transistor circuit, that interconnects the LED 20 to the batteries 32 when an incoming infrared signal 35 is received. As soon as the infrared signal 35 is no longer being received, the state of the electronic switch 38 changes and the LED 20 is disconnected from the batteries 32. Thus, it will be understood that as long as an infrared signal 35 strikes the trail marker 12, the trail marker 12 will illuminate. As soon as an infrared signal 35 is removed, the trail marker 12 again goes dark.

If the infrared sensor 30 within the trail marker 12 merely detects the presence or absence of infrared light, the remote control handset 14 can be any infrared light source, such as a television remote control handset or an infrared flashlight. In such an arrangement, the remote control handset 14 can be made very inexpensively since it needs to contain only an infrared LED 34 and a battery 32 to power the LED 20.

Figure 4:
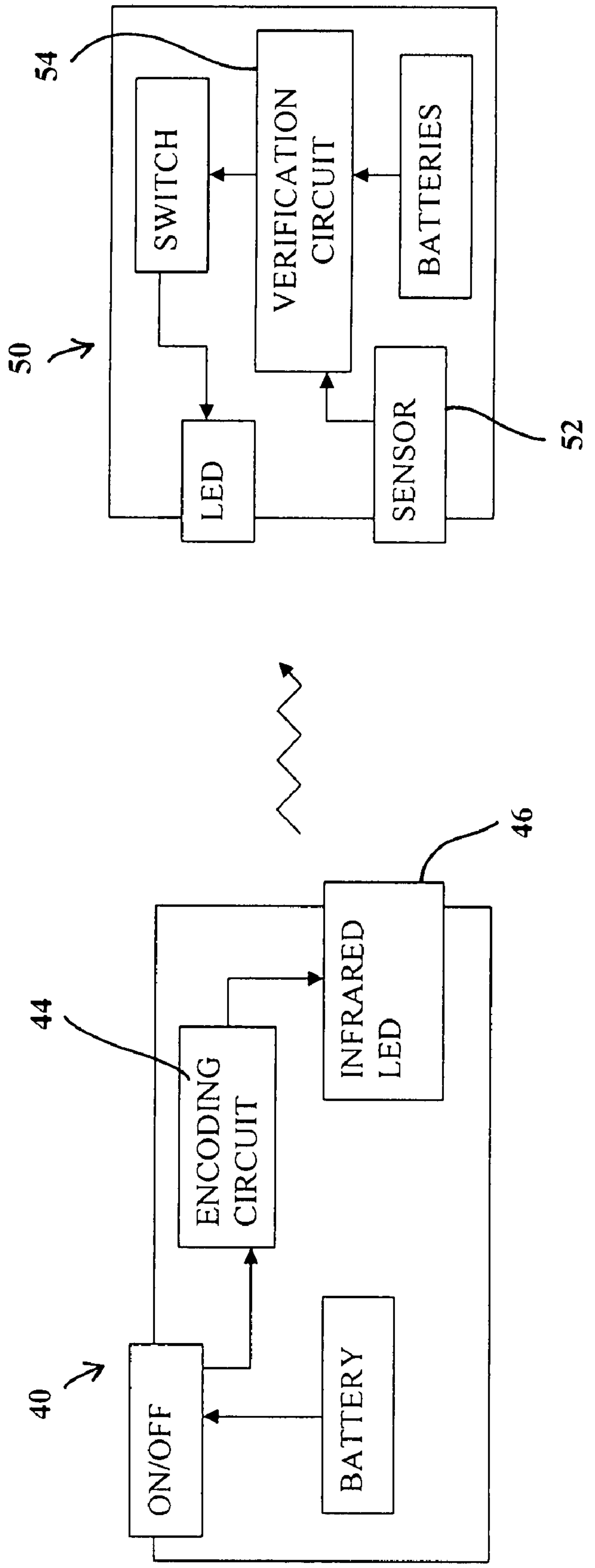
FIG. 4 is a schematic of an exemplary embodiment of a second alternate embodiment of a trail marker.

Referring to FIG. 4, a first alternate embodiment of the present invention system 40 is shown. In this embodiment, the remote control handset 42 contains an encoding circuit 44 that produces a specifically coded infrared signal 46. Within the trail marker 50, the infrared sensor 52 is connected to a code verification circuit 54. Only upon the receipt of a specific infrared signal will the trail marker 40 illuminate.

Figure 5:
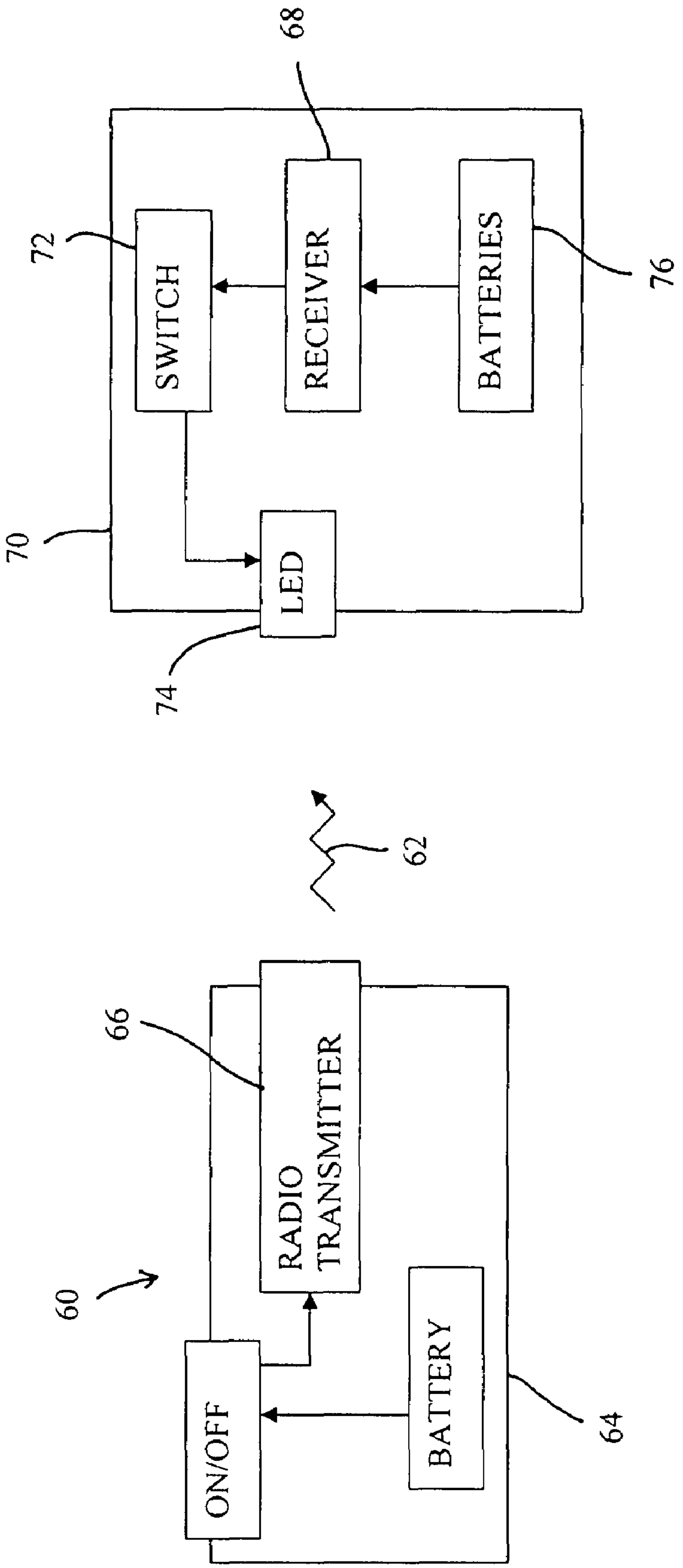
FIG. 5 is a schematic of an exemplary embodiment of a third alternate embodiment of a trail marker.

Referring to FIG. 5, a second alternate embodiment of the present invention system 60 is shown. In this embodiment, radio frequency signals 62 are used to activate and deactivate the trail marker 70. The remote control handset 64 contains a transmitter 66 that transmits either an activation signal or a deactivation signal. The trail marker 70 contains a receiver 68 for receiving the signals transmitted by the remote control handset 64. The receiver 68 is attached to a circuit that contains an electronic switch 72. The state of the electronic switch 72 changes depending upon whether an activation signal or a deactivation signal is received. When an activation switch is received, the electronic switch 72 connects the LED 74 to the batteries 76 and the LED 74 lights. When a deactivation signal is received, the electronic switch 72 disconnects the LED 74 from the batteries 76 and the LED 74 goes dark.

In the embodiments where infrared signals are used, a hunter would need to be in direct sight of a trail marker in order to activate that trail marker. However, when radio signals are used, no line of sight orientation is needed and all of the trail markers along a trail can be activated or deactivated simultaneously.

Figure 6:
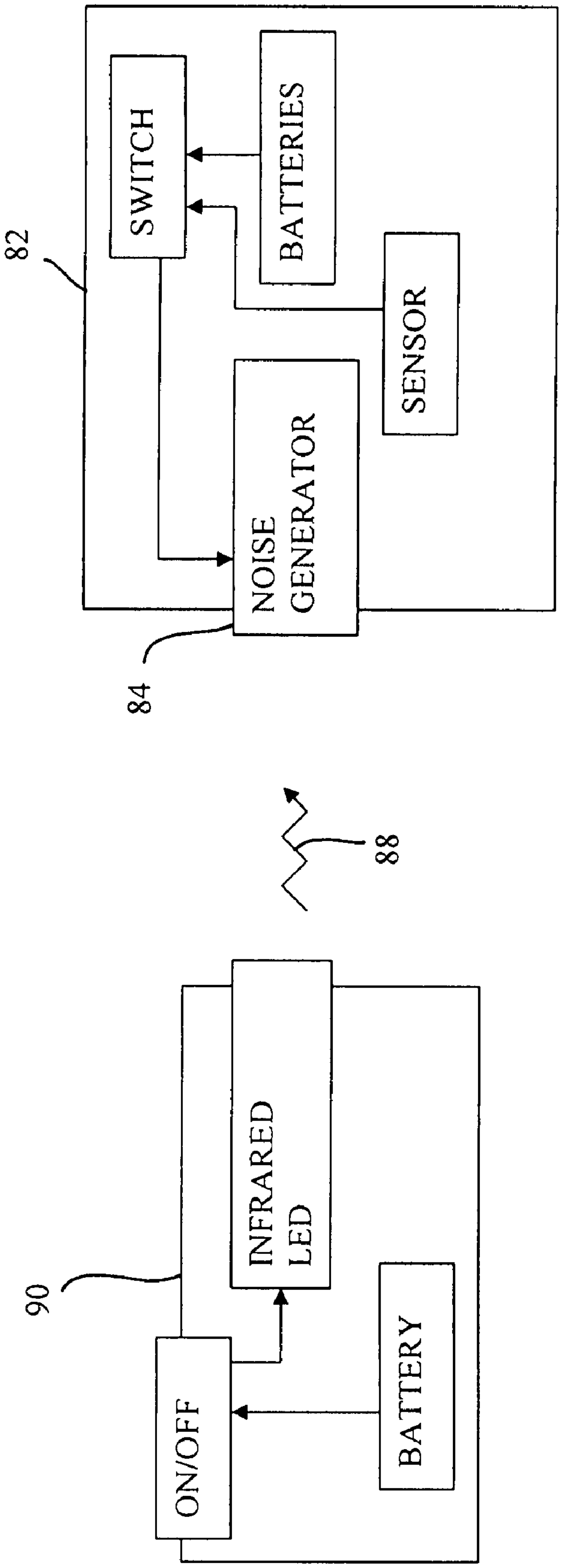
FIG. 6 is a schematic of an exemplary embodiment of a fourth alternate embodiment of a trail marker.

Referring to FIG. 6, a third alternate embodiment of the present invention system 80 is shown. In this embodiment, the trail marker 82 contains an electronic noise generator 84. The electronic noise generator 84 can be substituted for the LED in any of the previously described embodiments or can be used in conjunction with the LED of any of the earlier described embodiments. The electronic noise generator creates an audible signal when activated. The electronic noise generator is activated when the trail marker 82 receives and activation signal 88 from the remote control handset 90.

It will therefore be understood that when a hunter uses the remote control handset 90, all the tail markers 80 that receive the activation signal 88 will make noise. A hunter can then follow a trail by listening for the noises made by the trail markers 80. The hunter, therefore, does not have to see the trail markers 80 in order to follow the trail.

Returning to FIG. 1, the method of use for the present invention system can now be understood. A hunter starts a trail by inserting a trail marker 12 into a tree or post along the trail until trail markers 12 are present along the entire trail. Upon returning to the trail, the trail markers 12 can be illuminated using a remote control handset 14 carried by the hunter. After having traveled the trail, the hunter can deactivate the trail markers 12. The trail markers 12 are therefore only apparent to the hunter when needed by the hunter. At all other times, the trail markers 12 are inconspicuous and therefore are not likely to be removed by passers by.

It will be understood that the embodiments of the present invention trail marking system that have been described and illustrated are merely exemplary and that a person skilled in the art can make many modifications to those embodiments. All such modifications, variations and alternate embodiments are intended to be included within the scope of the present invention as claimed.

What is claimed is:

1. A trail marker system comprising:

a portable signal transmitter that transmits an activation signal;

a plurality of illumination devices, wherein all of said illumination devices activate when said activation signal is received from said signal transmitter, wherein each of said plurality of illumination devices includes:

a housing having a solid rear surface and an open face, wherein said housing defines an interior having a volume of less than one cubic inch between said open face and said rear surface;

a circuit board contained within said housing, said circuit board containing a signal detector and at least one LED oriented toward said open face, wherein said circuit board causes said at least one LED to activate when said activation signal is received by said signal detector;

a lens element covering said open face of said housing, wherein said signal detector and said at least one LED are confined under said lens element in said housing;

a spike extending outwardly from said rear surface of said housing, wherein said spike is configured to selectively pierce a tree, thereby joining said housing to the tree.

2. The system according to claim 1, further including at least one battery contained within said housing for powering said at least one LED.

3. The system according to claim 1, wherein said signal detector is an infrared signal detector.

4. The system according to claim 1, wherein said activation signal is an infrared signal.

5. The system according to claim 1, wherein said activation signal is a radio signal.

6. The system according to claim 1, wherein said housing has an exterior surface that is camouflaged.

7. The system according to claim 1, wherein said at least one LED automatically deactivates when said activation signal is no longer detected by said signal detector.

8. A method of marking a trail so that the trail can only be identified by an authorized individual, said method comprising the steps of:

providing a light transmitter that emits a light signal;

providing a plurality of trail markers that activate by illuminating the trail markers when said light signal from said light transmitter shines thereon and deactivate when said light signal is absent, wherein each of said trail markers contains a housing and a spike that extends from said housing;

placing said trail markers at positions along a selected trail;

providing an authorized person with said light transmitter; and having said authorized person travel along said selected trail shining said light transmitter, wherein said trail markers in direct sight of said light transmitter activate.

9. The method according to claim 8, wherein each of said trail markers contains signal detector supported by said housing that detects said light signal, and a light source that shines light away from said housing when activated, wherein said light source becomes activated when said signal detector detects said light signal.

10. The method according to claim 8, wherein each of said trail markers contains signal detector supported by said housing that detects said light signal, and a noise generator that produces an audible sound when activated, wherein said noise generator becomes activated when said signal detector detects said light signal.

11. The method according to claim 9, wherein each said housing has a volume of less than one cubic inch.

12. The method according to claim 9, wherein each said spike is between ¼ of an inch and one inch long.

13. The method according to claim 8, wherein said light signal is an infrared signal.

14. The method according to claim 8, wherein said housing has an exterior surface that is camouflaged.

15. A trail marking kit, comprising;

a plurality of trail marking lights that can be selectively activated by remote control, wherein each of said trail marking lights has a housing with a small spike extending therefrom;

a hand tool that temporarily engages said housing of said trail marking lights to facilitate the attachment and removal of each of said trail marking lights to a tree; and a remote control handset that transmits an activation signal for remotely activating said trail marking lights.

* * * * *